United States Patent
Hasegawa et al.

(10) Patent No.: US 6,234,381 B1
(45) Date of Patent: May 22, 2001

(54) WATER-BASE BINDER FOR ALUMINUM MATERIAL BRAZING, BRAZING COMPOSITION, AND METHOD OF BRAZING WITH THE COMPOSITION

(75) Inventors: Yoshiharu Hasegawa, Obu; Shoei Teshima, Handa; Ichiro Taninaka, Himeji; Hikaru Shibata, Kakogawa, all of (JP)

(73) Assignees: Denso Corporation; Harima Chemicals, Inc., both of (JP)

( * ) Notice: Subject to any disclaimer, the term of this patent is extended or adjusted under 35 U.S.C. 154(b) by 0 days.

(21) Appl. No.: 09/423,997
(22) PCT Filed: Dec. 18, 1998
(86) PCT No.: PCT/JP98/05758
§ 371 Date: Nov. 17, 1999
§ 102(e) Date: Nov. 17, 1999
(87) PCT Pub. No.: WO99/52672
PCT Pub. Date: Oct. 21, 1999

(30) Foreign Application Priority Data

Apr. 14, 1998 (JP) .................................. 10-102685
Sep. 16, 1998 (JP) .................................. 10-261493

(51) Int. Cl.[7] .................................. B23K 1/20
(52) U.S. Cl. .................................. 228/223; 228/262.43
(58) Field of Search .................................. 228/223, 207, 228/262.43

(56) References Cited

U.S. PATENT DOCUMENTS 3,040,781 * 6/1962 Reymann et al. .
4,398,660 * 8/1983 Pampalone .
4,504,007 * 3/1985 Anderson, Jr. et al. .
4,615,479 * 10/1986 Ohotoshi et al. .
5,156,326 * 10/1992 Gibson .
5,755,374 * 5/1998 Prigmore .

FOREIGN PATENT DOCUMENTS 63-43200   8/1988 (JP) .
6-39586    2/1994 (JP) .

* cited by examiner

Primary Examiner—Patrick Ryan
Assistant Examiner—Jonathan Johnson
(74) Attorney, Agent, or Firm—Morrison Law Firm (57) ABSTRACT

The present invention is a water-based binder used when manufacturing aluminum brazed products such as engine radiators, condensers for car air conditioners, and the like. The water-based binder is obtained by saponifying an ester methacrylate polymer that has an acid value and a glass transition temperature within specified ranges. In the presence of an alcohol that is water soluble and volatile and has a flash point higher than a specified temperature, the brazing composition, in which this binder and flux and the like are mixed, does not have the risk of catching on fire or exploding and also has excellent wettability and can be uniformly coated onto an aluminum material. Furthermore, when a binder in which polyoxirane or polyoxazoline is added as a sub component to this ester methacrylate polymer, which is the main component, the room temperature adhesion of the brazing composition onto the aluminum materials is further improved, and thickening of this composition during coating or storage is also prevented.

20 Claims, 6 Drawing Sheets

| | Solvent (parts) | Monomer composition (parts) | Polymerization initiating agent (parts) | Acid Value |
|---|---|---|---|---|
| Embodiment 1 | isopropyl alcohol (70) | 2-ethylhexyl methacrylate (27) 2-hydroxyethyl methacrylate (3) methacrylic acid (2.5) | benzoyl peroxide (0.9) | 50 |
| Embodiment 2 | isopropyl alcohol (70) | 2-ethylhexyl methacrylate (27) 2-hydroxyethyl methacrylate (3) methacrylic acid (3.3) | benzoyl peroxide (0.9) | 65 |
| Embodiment 3 | isopropyl alcohol (70) | 2-ethylhexyl methacrylate (27) 2-hydroxyethyl methacrylate (3) methacrylic acid (4) | benzoyl peroxide (0.9) | 77 |
| Embodiment 4 | isopropyl alcohol (70) | 2-ethylhexyl methacrylate (27) 2-hydroxyethyl methacrylate (3) methacrylic acid (5) | benzoyl peroxide (0.9) | 93 |
| Comp. Ex. 1 | isopropyl alcohol (70) | 2-ethylhexyl methacrylate (27) 2-hydroxyethyl methacrylate (3) | benzoyl peroxide (0.9) | 0 |
| Comp. Ex. 2 | isopropyl alcohol (50) | 2-ethylhexyl methacrylate (50) | benzoyl peroxide (1.5) | 0 |
| Comp. Ex. 3 | isopropyl alcohol (70) | 2-ethylhexyl acrylate (30) | benzoyl peroxide (0.9) | 0 |

Fig. 1

|  | Solvent (parts) | Monomer composition (parts) | Polymerization initiating agent (parts) | Acid Value |
|---|---|---|---|---|
| Embodiment 1 | isopropyl alcohol (70) | 2-ethylhexyl methacrylate (27) 2-hydroxyethyl methacrylate (3) methacrylic acid (2.5) | benzoyl peroxide (0.9) | 50 |
| Embodiment 2 | isopropyl alcohol (70) | 2-ethylhexyl methacrylate (27) 2-hydroxyethyl methacrylate (3) methacrylic acid (3.3) | benzoyl peroxide (0.9) | 65 |
| Embodiment 3 | isopropyl alcohol (70) | 2-ethylhexyl methacrylate (27) 2-hydroxyethyl methacrylate (3) methacrylic acid (4) | benzoyl peroxide (0.9) | 77 |
| Embodiment 4 | isopropyl alcohol (70) | 2-ethylhexyl methacrylate (27) 2-hydroxyethyl methacrylate (3) methacrylic acid (5) | benzoyl peroxide (0.9) | 93 |
| Comp. Ex. 1 | isopropyl alcohol (70) | 2-ethylhexyl methacrylate (27) 2-hydroxyethyl methacrylate (3) | benzoyl peroxide (0.9) | 0 |
| Comp. Ex. 2 | isopropyl alcohol (50) | 2-ethylhexyl methacrylate (50) | benzoyl peroxide (1.5) | 0 |
| Comp. Ex. 3 | isopropyl alcohol (70) | 2-ethylhexyl acrylate (30) | benzoyl peroxide (0.9) | 0 |

Fig. 2

| Binder | Acid value | Adhesion | Peeling resistance | Blocking resistance | Solvent resistance | Decomp. under $N_2$ | Brazing property (Method A) | Brazing property (Method B) |
|---|---|---|---|---|---|---|---|---|
| Embodiment 1 | 50 | ○ | ○ | ○ | Δ | ○ | ○ | ○ |
| Embodiment 2 | 65 | ○ | ○ | ○ | ○ | ○ | ○ | ○ |
| Embodiment 3 | 77 | ○ | ○ | ○ | ○ | ○ | ○ | ○ |
| Embodiment 4 | 93 | ○ | ○ | ○ | ○ | ○ | ○ | ○ |
| Comp. Ex. 1 | 0 | ○ | ○ | ○ | X | ○ | ○ | ○ |
| Comp. Ex. 2 | 0 | Δ | ○ | ○ | X | ○ | ○ | ○ |
| Comp. Ex. 3 | 0 | ○ | ○ | X | X | X | Δ | Δ |

Fig. 3

| Binder | Brazing Composition | Viscosity stability | Blocking resistance | Initial coating hardness | Solvent resistance | Brazing property |
|---|---|---|---|---|---|---|
| Embodiment 5 | Flux | O | O | H | 2B | O |
| | Flux + brazing material | O | O | HB | 2B | Δ |
| Embodiment 6 | Flux | O | O | F | 2B | O |
| | Flux + brazing material | O | O | HB | 3B | O |
| Embodiment 7 | Flux | O | O | B | 3B | O |
| | Flux + brazing material | O | O | B | 3B | O |
| Embodiment 8 | Flux | O | O | B | 2B | O |
| | Flux + brazing material | O | O | B | 2B | O |
| Embodiment 9 | Flux | O | O | H | B | O |
| | Flux + brazing material | O | O | F | 2B | O |
| Embodiment 10 | Flux | O | O | F | 2B | O |
| | Flux + brazing material | O | O | F | 3B | O |
| Comp. Ex. 4 | Flux | O | O | B | < 6B | - |
| | Flux + brazing material | O | O | 2B | < 6B | - |
| Comp Ex. 5 | Flux | O | O | F | HB | X |
| | Flux + brazing material | O | O | HB | B | X |
| Comp. Ex. 6 | Flux | X | - | - | - | - |
| | Flux + brazing material | X | - | - | - | - |
| Comp. Ex. 7 | Flux | Δ | O | B | 2B | O |
| | Flux + brazing material | Δ | O | B | 3B | O |

Fig. 4a

| Example | Mixing proportion (solid equivalents) | | | Added alcohol (parts / 100 parts solid equiv.) | Solid concentration | Flammability | Wettability | Blocking resistance | Brazing property |
|---|---|---|---|---|---|---|---|---|---|
| | Binder | Flux | Brazing material | | | | | | |
| Embod. 11 | 10 wt. parts | 90 wt. parts | ----- | No addition | 15 % | ○ | X | | X |
| | | | | Isopropyl alcohol (10) | 15 % | X | ○ | ○ | ○ |
| | | | | Propylene glycol butyl ether (10) | 15 % | ○ | ○ | ○ | ○ |
| | | | | 3-methoxy-3-methyl-1-butanol (20) | 15 % | ○ | ○ | ○ | ○ |
| | | 60 wt. parts | 30 wt. parts | No addition | 15 % | X | X | ○ | X |
| | | | | Isopropyl alcohol (10) | 15 % | ○ | ○ | ○ | ○ |
| | | | | Propylene glycol butyl ether (10) | 15 % | ○ | ○ | ○ | ○ |
| | | | | 3-methoxy-3-methyl-1-butanol (20) | 15 % | ○ | ○ | ○ | ○ |
| Embod. 12 | 10 weight parts | 90 wt. parts | ----- | No addition | 15 % | X | X | ○ | X |
| | | | | Isopropyl alcohol (10) | 15 % | ○ | ○ | ○ | ○ |
| | | | | Propylene glycol butyl ether (10) | 15 % | ○ | ○ | ○ | ○ |
| | | | | 3-methoxy-3-methyl-1-butanol (20) | 15% | ○ | ○ | ○ | ○ |
| | | 60 wt. parts | 30 wt. parts | No addition | 15 % | X | X | ○ | X |
| | | | | Isopropyl alcohol (10) | 15 % | ○ | ○ | ○ | ○ |
| | | | | Propylene glycol butyl ether (10) | 15 % | ○ | ○ | ○ | ○ |
| | | | | 3-methoxy-3-methyl-1-butanol (20) | 15 % | ○ | ○ | ○ | ○ |

Fig. 4b

| Example | Mixing proportion (solid equivalents) | | | Added alcohol (parts / 100 parts solid equiv.) | Solid concentration | Flammability | Wettability | Blocking resistance | Brazing property |
|---|---|---|---|---|---|---|---|---|---|
| | Binder | Flux | Brazing material | | | | | | |
| Comp. Example 8 | 10 wt. parts | 90 wt. parts | ---- | Propylene glycol butyl ether (10) | 15 % | ○ | ○ | × | ○ |
| | | | | 3-methoxy-3-methyl-1-butanol (20) | 15 % | ○ | ○ | × | ○ |
| | | 60 wt. parts | 30 wt. parts | Propylene glycol butyl ether (10) | 15 % | ○ | ○ | × | ○ |
| | | | | 3-methoxy-3-methyl-1-butanol (20) | 15 % | ○ | ○ | × | ○ |
| Comp. Example 9 | 10 wt. parts | 90 wt. parts | ---- | Propylene glycol butyl ether (10) | 15 % | ○ | △ | ○ | △ |
| | | | | 3-methoxy-3-methyl-1-butanol (20) | 15 % | ○ | △ | ○ | △ |
| | | 60 wt. parts | 30 wt. parts | Propylene glycol butyl ether (10) | 15 % | ○ | △ | ○ | △ |
| | | | | 3-methoxy-3-methyl-1-butanol (20) | 15 % | ○ | △ | ○ | △ |
| Comp. Example 10 | 10 weight parts | 90 wt. parts | ---- | Propylene glycol butyl ether (10) | 15 % | ○ | ○ | ○ | △ |
| | | | | 3-methoxy-3-methyl-1-butanol (20) | 15 % | ○ | ○ | ○ | △ |
| | | 60 wt. parts | 30 wt. parts | Propylene glycol butyl ether (10) | 15 % | ○ | ○ | ○ | △ |
| | | | | 3-methoxy-3-methyl-1-butanol (20) | 15 % | ○ | ○ | ○ | △ |

Fig. 5

WATER-BASE BINDER FOR ALUMINUM MATERIAL BRAZING, BRAZING COMPOSITION, AND METHOD OF BRAZING WITH THE COMPOSITION

OBJECTS AND SUMMARY OF THE INVENTION

1. Technical Field

Firstly, the present invention relates to a water-based binder that is used when brazing aluminum materials. This binder has excellent heat decomposition, room temperature adhesion, viscosity stability, and resistance against processing oil, and the like. Secondly, the present invention relates to a brazing composition that is a mixture, comprising: this water based binder and flux, or this water based binder, flux, and a brazing material. This brazing composition is not flammable or explosive because it is water-based. It has good wettability and can form a uniform coating on the aluminum material. Thirdly, the present invention relates to a brazing method for aluminum materials using this brazing composition.

2. Background Technology

In the prior art, almost all engine radiators and condensers and evaporators for car air conditioners are manufactured from aluminum materials. The aluminum materials are joined together through brazing.

Recently, because of concerns over productivity, flux brazing methods in which brazing is conducted using flux has become mainstream, replacing the vacuum brazing method which does not use flux. In this flux brazing method, flux, such as fluoroaluminate, or a mixture in which brazing material is added to this flux (in other words, the brazing composition) needs to be supplied to the brazing sites of the aluminum material. In order to improve the adhesion to the aluminum material, coating of this brazing composition is conducted after various binders have been added.

For these binders, oil-based binders in which various organic resins are dissolved in organic solvents such as alcohol, toluene, acetone, and the like, and water-based binders comprising water based organic resins have been used or reported.

When aluminum materials are coated using the oil-based binders as described above, there is good adhesion to the aluminum materials, and excessive cissing phenomenon is not seen. Uniform coating with the brazing composition is also achieved. However, because organic solvents are used, it can be flammable or explosive when used. In order to avoid these risks, expensive explosion-proof devices are needed. Furthermore, working with organic solvents in the air can pose many health problems.

On the other hand, when using water-based binders, these are not flammable or explosive, but because water is used as a solvent, the wetting onto the aluminum is extremely poor, and because of cissing of the water on the aluminum material, it is difficult to have a uniform coating of the brazing composition.

For example, in Japanese Laid-Open Patent Publication Number 6-285682 (hence referred to as the prior art technology), there is disclosed a brazing composition that uses a water-soluble organic resin, such as acrylic resin, cellulose resin, epoxy resin, polyvinyl alcohol resin, and the like, as the main component of the binder. However, in general, water-based binders that have water soluble resins as their main component have poor heat decomposition. When brazing, carbides can remain and can cause corrosion. Fillets are not well-formed, and this can have a negative impact on brazing.

Normally, when manufacturing brazed products, after coating the aluminum materials with the brazing composition, various processing of aluminum materials is conducted prior to brazing. This processing of aluminum can include press processing for adjusting the thickness, bending, or stretching or the like.

After the aluminum materials are coated with the brazing composition in which the binders from the prior art are added, various problems often arise for both oil-based and water-based binders when the above processing is conducted. The brazing composition can fall off of the aluminum material, cracks can be generated at the surface, or if aluminum materials are stacked, there can be blocking together of the aluminum materials. In addition, because hydrocarbon organic solvents such as cutting oil and press processing oil and the like are used when working with aluminum material, the binder can become dissolved in these organic solvents, and the brazing composition can fall off.

Furthermore, in this prior art technology, when water soluble organic resins such as acrylic resins are used as the binder for the flux, if melamine resin or benzoguanamine resin, or the like are added as the hardening agent to this water soluble organic resin, the adhesion to the aluminum material has been shown to be improved. In order to prevent the brazing composition from falling off through contact with organic solvents or through the above processing, the use of this technology of hardening binder can be considered. However, in reality, when such a heat curing binder is used, while the brazing composition is applied to the aluminum material, or while the manufactured brazing composition is being stored, this composition thickens as time passes, and the coating operation becomes difficult.

The object of the present invention is to develop a new binder for aluminum brazing and a brazing composition to which this binder has been added. The present invention has excellent properties of thermal decomposition when brazing, room temperature adhesion to the aluminum material, viscosity stability during coating or storing, and oil resistance against processing oil and the like. There is also no risk of catching on fire or of explosion. The present invention also has good wettability onto aluminum materials.

According to an embodiment of the present invention, there is provided a water based binder for brazing aluminum materials comprising: an ester methacrylate polymer; the ester methacrylate polymer having a glass transition temperature between about −30° C. to 60° C., and an acid value between about 20 to 80 when dry; the ester methacrylate polymer capable of being saponified by a compound having cationic properties in an aqueous solution; and the ester methacrylate polymer capable of forming an aqueous solution with a solid concentration of between about 1 to 50 weight percent.

According to another embodiment of the present invention, there is provided an aluminum brazing composition comprising: from about 1 to 50 parts by weight of a water based binder; the water based binder being an ester methacrylate polymer having a glass transition temperature between about −30° C. to 60° C. and an acid value between about 20 to 80 when dry; the ester methacrylate polymer capable of being saponified by a compound having cationic properties in an aqueous solution; and the ester methacrylate polymer capable of forming an aqueous solution with a solid concentration of between about 1 to 50 weight percent.

According to a further embodiment of the present invention, there is provided a method for brazing aluminum materials, comprising: contacting a brazing composition with at least a portion of at least one of a first aluminum material and a second aluminum material; the brazing composition having from about 1 to 50 parts by weight of a water based binder; the water based binder being an ester methacrylate polymer having a glass transition temperature between about −30° C. to 60° C. and an acid value between about 20 to 80 when dry; the ester methacrylate polymer capable of being saponified by a compound having cationic properties in an aqueous solution; the ester methacrylate polymer capable of forming an aqueous solution with a solid concentration of between about 1 to 50 weight percent; supplying flux to at least one of the first aluminum material and the second aluminum material; assembling the first aluminum material and the second aluminum material into a specified configuration; and heating and brazing the first aluminum material with the second aluminum material.

In order to develop a new binder for adding to a brazing composition for aluminum materials, we mainly studied various organic resins for their suitability as a binder for brazing. As a result, it has been discovered that acrylic or methacrylic resins are suitable as binders.

Next, when further research on the above resins were conducted, polymers that have monomer components of acrylic acid or acrylic acid derivatives were found to have poor thermal decomposition properties during brazing, and poor brazing often occurred. As a result, it was found that ester methacrylate polymers (polymers consisting of methacrylic acid esters) with a combination of certain acid values (the number of mg of potassium hydroxide required to neutralize the alkali-reactive groups in one gram of the sample, the unit being mgKOH/g) and glass transition temperatures were suitable. Furthermore, by taking a water based binder in which this ester methacrylate polymer has been saponified with a certain compound, adding it to a flux or a mixture of a flux and brazing material in the presence of certain alcohols, and then diluting this with water, it was discovered that in addition to there being no risk of catching fire or of explosion, the wettability with respect to the aluminum material was also improved. Based on these findings, the present invention was completed.

The first invention is a water-based binder for brazing aluminum materials, wherein: an ester methacrylate polymer, having a glass transition temperature in the range of −30 degrees C. to 60 degrees C. and an acid value of 20–80 when dry, is saponified with a compound that shows cationic properties in aqueous solutions; this is made into an aqueous solution with a solid concentration of 1–50 weight %.

In the present invention, the term aluminum material includes pure aluminum materials and aluminum alloy materials.

In the first invention described above, in the ester methacrylate polymer that is the main component of the binder, the monomer components that construct this polymer contain at least one component that is a monomer represented by the formula (1) below. Stated more concretely, a suitable copolymer has at least 1 component of a monomer of formula (1) and at least 1 component of a monomer that contains a carboxyl group and is capable of copolymerizing with this monomer, such as acrylic acid, methacrylic acid, maleic acid, itaconic acid.

(In formula (1), R is a $C_1$–$C_{12}$ alkyl group)

With an ester methacrylate polymer with a glass transition temperature below −30 degrees C., the viscosity increases. In a mass production step of applying the brazing composition, the aluminum materials can become blocked together while the aluminum materials are stacked and left on top of each other prior to brazing. There is the risk of brazing composition falling off. Furthermore, with a polymer with a glass transition temperature exceeding 60 degrees C., when applying the brazing composition, there may be reduced adhesion of the brazing composition to the aluminum materials.

When the acid value of the ester methacrylate polymer exceeds 80 when dry, there is a tendency for carbides to be generated at the time of brazing. When the acid value is under 20 when dry, even when the ester methacrylate polymer is saponified with a compound that shows cationic properties in an aqueous solution, the solubility of this polymer in water is reduced. Therefore, in a copolymer with an increased ratio of the monomer containing carboxyl group as described above, the acid value of the ester methacrylate polymer becomes high. As a result, it is necessary to limit the acid value to 80 or below.

Furthermore, in the first invention, for the ester methacrylate polymer that is the main component, a copolymer having at least 1 component of a monomer represented by the above formula (1), at least 1 component of a monomer containing a carboxyl group, and at least 1 component of a monomer containing a hydroxyl group represented by the following formula (2) or (3) can be used.

(In formula (2), k is an integer of 2–4)

(In formula (3), m and n are each an integer between 0–12, m and n cannot both be 0; EO represents an oxyethylene group ($C_2H_4O$), PO represents an oxypropylene group ($C_3H_6O$), there is no limitation on the positions of each and can be a random sequence).

When n=0, the monomer in the above formula (3) represents

When m=0; it represents

In the case when m=n not equal to 0, the sequence of the oxyethylene groups and the oxypropylene groups is not important, and they can be mixed at random (therefore, the monomer in formula (3) can have, for example, the basic methacrylic acid backbone joined to an oxypropylene group, and next joined to an oxyethylene group.)

When monomers represented by formula (2) and (3), which contain hydroxyl groups, are copolymerized, the room temperature adhesion of the brazing composition to the aluminum materials is further improved. However, if the hydroxyl value of the ester methacrylate polymer exceeds 100 when dry, carbides are generated when brazing, thus there can be a negative effect on brazing. Therefore, it is preferable to have a hydroxyl value of 100 or less.

In the above first invention, the ester methacrylate polymer is obtained by radical polymerization through known polymer methods such as bulk polymerization, solution polymerization, suspension polymerization. However, in concrete terms, a solution polymerization with alcohol as the solvent is preferred.

The binder of the first invention is a water-based binder in which the above ester methacrylate polymer is saponified by a compound that shows cationic properties in an aqueous solution, and then this is adjusted to an aqueous solution with a solid concentration of 1–50 weight %.

Examples of the cationic compound described above include: amino alcohols, ammonia, diethyl amine, triethyl amine, and the like. Volatile amino alcohols are preferable. These compounds act mainly on the carboxyl group that are present within the molecule of the ester methacrylate polymer described above, and the ester methacrylate polymer is saponified.

In the first invention, an oxirane group containing resin (polyoxirane) or oxazoline group containing resin (polyoxazoline) can be added to the saponified ester methacrylate polymer as a sub component. When a water based binder to which these resins have been added is used and the brazing composition is heated and dried at around 200 degrees C. and hardened, the adhesion to the aluminum material is improved.

In this case, the oxirane group or oxazoline group content concentration in the saponified polymer needs to be 0.1–100 mmol/g when dry. If the oxirane or oxazoline content concentration is less than 0.1 mmol/g, the heat curing of the main component ester methacrylate polymer is poor. The addition amount of the polyoxirane or polyoxazoline is preferably 20 weight parts or less with respect to the ester methacrylate. When more than 20 weight parts is added, carbides are generated at the time of brazing, and it can have a negative impact on brazing.

As described previously, the acid value of the ester methacrylate polymer is preferably 80 or less. However, for the lower limit of the acid value, from the standpoint of maintaining the heat curing property by polyoxirane or polyoxazoline, the acid value is preferably 20 or greater. In other words, from the standpoint of both heat curing and brazing, the acid value of the ester methacrylate polymer is preferably between 20–80.

The second invention is an aluminum brazing composition in which flux is added to the various water based binders described above. In terms of solid equivalents, the second invention contains 1–50 weight parts of the water based binder described above, 50–100 weight parts of a fluoroaluminate flux, 1–50 weight parts of an alcohol that is water-soluble, volatile, and has a flash point of 30 degrees C. or greater. This is diluted with water.

The third invention is an aluminum brazing composition in which the various water-based binders described above is added to a mixture of a flux and brazing material. In terms of solid equivalents, it contains 1–50 weight parts of the water based binder described above, 30–70 weight parts of a fluoroaluminate flux, 10–40 weight parts of silicon brazing material, 1–50 weight parts of an alcohol that is water-soluble, volatile, and has a flash point of 30 degrees C. or greater. This is diluted with water.

Because a particular alcohol that is water-soluble and volatile is added to the brazing composition of the second and third invention as described above, the surface tension of this composition is reduced, and the wettability of this composition onto the aluminum material is improved (in other words, the cissing phenomenon of water is suppressed), and the leveling property with respect to the aluminum material is improved.

Furthermore, when alcohols that have a flash point of less than 30 degrees C., such as methanol, ethanol, or isopropyl alcohol, and the like, are used, it can be flammable or explosive. Therefore, in the second and third invention described above, an alcohol with a flash point of 30 degrees C. or greater is used.

Among these, an alcohol with a high flash point as well as one in which the surface tension of the brazing composition is reduced by adding only a small amount is preferred. Concrete examples of such an alcohol include the following: ethylene glycol methyl ether, ethylene glycol ethyl ether, ethylene glycol butyl ether, diethylene glycol methyl ether, diethylene glycol ethyl ether, diethylene glycol butyl ether, propylene glycol monomethyl ether, propylene glycol monoethyl ether, propylene glycol monobutyl ether, dipropylene glycol monomethyl ether, dipropylene glycol monoethyl ether, dipropylene glycol monobutyl ether, 1,3-butane diol, 3-methyl-1,3-butane diol, 3-methoxy-3-methyl-1-butanol, and the like.

The form of the above brazing composition is not important and can be a water based liquid, or a paste, or the like. If the brazing composition is a water-based liquid, it should be diluted with water so that the solid concentration is around 10–70 weight %. With a paste composition, the solid concentration can be greatly increased.

The fourth invention is a brazing method for aluminum materials using the brazing composition of the second invention. Aluminum material is brought into contact with the brazing composition of the second invention, and with the result that flux is supplied, next this aluminum material is assembled together in the specified configuration with another aluminum material that has been supplied with a brazing material. Both aluminum materials are heated and brazed.

The fifth invention is a brazing method for aluminum materials using the brazing composition of the third invention. Aluminum material is brought into contact with the brazing composition of the third invention, and with the result that flux and brazing material are supplied, next this aluminum material is assembled together in the specified configuration with another aluminum material. Both aluminum materials are heated and brazed.

In the fourth and fifth inventions, the flux described above is a fluoroaluminate component. Stated more concretely, it is an alkali metal salt such as sodium fluoroaluminate, potassium fluoroaluminate, or the like, or an alkali earth metal salt.

The brazing material described above is a silicon component. Stated more concretely, it is a metal silicon powder or Si—Al alloy or the like.

Methods for contacting the above brazing composition to the aluminum material include immersion process, machine method with a coater, or a manual coating process such as by brush or the like, and atomization such as by a spray or the like. From the standpoint of achieving a uniform coating and using the brazing composition efficiently and without waste, the immersion process or the coating process is preferable.

For example, by immersing the aluminum material in a water-based liquid of the brazing composition, or by coating this water-based liquid onto the aluminum material, the needed amount of flux or the mixture of flux and brazing material can be evenly supplied. Furthermore, with a composition in a paste form, it can be uniformly supplied onto the aluminum material through the coating process.

Next, using the brazing composition of the second invention, the brazing is implemented by assembling the aluminum material, to which the flux has been supplied, and another aluminum material, to which the brazing material has been supplied, together into the specified configuration and heating to a brazing temperature of around 600 degrees under nitrogen atmosphere. When the brazing composition of the third invention is used, the brazing is conducted by assembling together the aluminum material to which the flux and the brazing material has been supplied with the other aluminum material (in other words, the bare aluminum material with no brazing composition) and heating to a brazing temperature under a nitrogen atmosphere.

The characteristics and the advantages of the binder and brazing composition of the present invention will be described in sequence. The binder of the first invention is water-based, and the brazing compositions using this water-based binder are the second and third inventions. In other words, in the presence of certain alcohols with a flash point of 30 degrees C. or greater, the binder described above is included with flux, or with flux and a brazing material, and diluted with water to make the brazing composition. As a result, a highly flammable organic solvent is not used, and there is no danger of explosion or catching on fire under normal use. In fact, by the advantages of the alcohol described above, the surface tension of the brazing composition is reduced, and the wettability with respect to the aluminum material is improved. As a result, the cissing phenomenon of water is suppressed, and a uniform coating is achieved.

Furthermore, because the brazing composition uses the water based binder of the first invention, in the brazing furnace which is under a nitrogen atmosphere, the ester methacrylate polymer that is the main component of the binder is depolymerized in a short amount of time at a temperature much lower than 600 degrees C. and becomes a volatile monomer. As a result, the water-based binder is eliminated during brazing, and neither the binder nor its carbides remain at the brazing sites. The fillet is formed well, and the strength of the brazed product is improved, and the durability is also improved.

As described above, when brazing aluminum materials, the aluminum materials are assembled together in the specified shape prior to brazing. For example, referring to FIG. 5, in a condenser for a car air-conditioner, after assembling tube material 1 and fin 2 into a specified brazing construction 3, the brazed product is completed by brazing together members 1 and 2. In this case, because the acid value of the ester methacrylate polymer that is the main component of the water based binder of the first invention is within the specified range, and because there is excellent room temperature adhesion to the aluminum material, even if an outside force is applied during the assembly operation, the brazing composition is effectively prevented from falling off of the aluminum material. Particularly if the ester methacrylate polymer described above is a copolymer that contains certain monomer components that contain a hydroxyl group, the room temperature adhesion to the aluminum materials is improved further.

Furthermore, if cross-linking agents of polyoxirane or polyoxazoline are added to the ester methacrylate polymer that is the main component to make a heat curing binder, the room temperature adhesion is further improved because of the cross-linking. As a result, the brazing composition is even further effectively prevented from falling off. Because particular resins of polyoxirane or polyoxazoline are used for the cross-linking agent described above, the brazing composition has viscosity stability and does not thicken during coating or storage, and the aluminum material can be coated uniformly. In fact, because polyoxirane and polyoxazoline are added at less than a specified rate, the thermal decomposition during brazing is also excellent.

Furthermore, because the binder of the first invention has excellent resistance against processing oil, even if it comes into contact with cutting oil or press processing oil, the binder does not easily dissolve in the cutting oil or the like. From this standpoint as well, the falling off of the brazing composition is effectively prevented.

The above, and other objects, features and advantages of the present invention will become apparent from the following description read in conjunction with the accompanying drawings, in which like reference numerals designate the same elements.

DETAILED DESCRIPTION OF THE INVENTION

The present invention will be described in detail in the following order. First, there are described the manufacture embodiments and suitability test examples of the aluminum brazing binder and brazing composition in which the type of the main component ester methacrylate polymer is varied. Second, manufacture embodiments and suitability test examples of heat curing binders and brazing compositions using these binders are described. Third, manufacture embodiments and suitability test examples of water-based binders and brazing compositions using these binders are described. In each of the embodiments and test examples, as a rule, the parts and % are based on weight.

Furthermore, the present invention is not limited to the following embodiments. Changes can be made within the technical scope of the present invention.

(1) Embodiments and Test Examples of the Aluminum Brazing Binder and Brazing Composition when the Type of Ester Methacrylate Polymer is Varied.

In these embodiments and test examples, with the goal of testing its suitability as a binder, the polymer that is the main component is varied. Therefore, for convenience, we tested by oil-based binders.

(A) Manufacture Embodiments of the Binder

Figure 1:
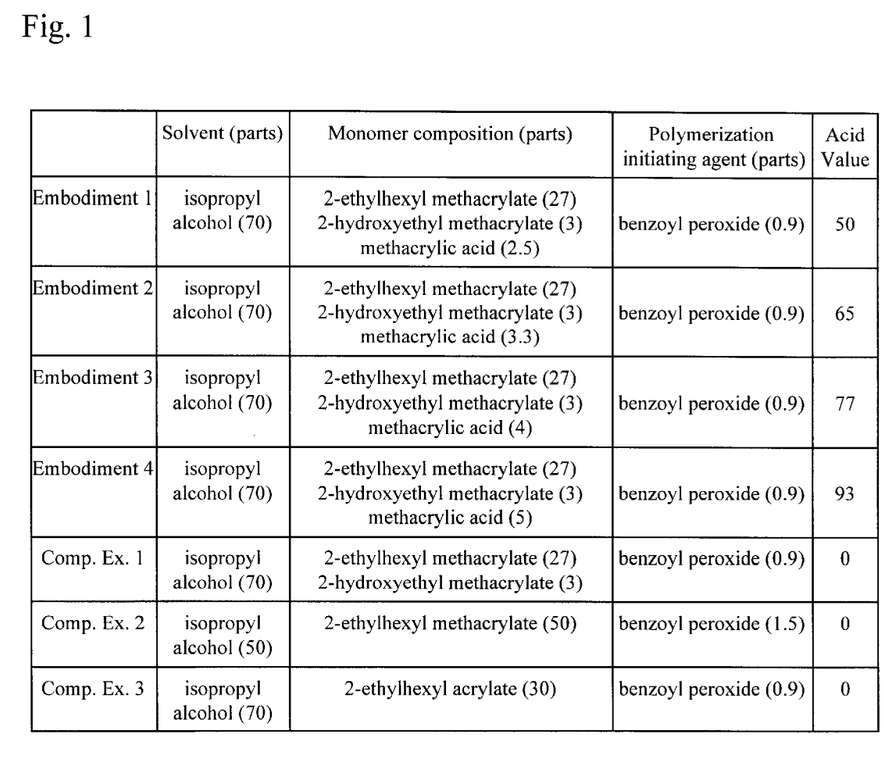
FIG. 1 is a diagram showing the monomer components that construct the ester methacrylate polymer that is the main component and the solvent used in the brazing composition.

First, each of the solvents indicated in FIG. 1 is placed inside a reaction device equipped with a stirring device, cooling tube, drip funnel, and a nitrogen introducing pipe. Next, under nitrogen gas flow, the temperature was raised until a system temperature of 80 degrees C. was achieved. Next, as indicated in FIG. 1, a solution comprising monomers of either ester methacrylate or ester acrylate and a polymerization initiation agent for each were dripped into the system over approximately 3 hours. For a further 1–10 hours, the above temperature was maintained, and the polymerization reaction was completed, and the various binders were obtained.

Among the ester methacrylate polymers that were obtained, the ones with an acid value in the range of 20–80 were labeled as Embodiments 1–4, and ones with an acid value of 0 were labeled as Comparative examples 1–2. Furthermore, the case where an ester acrylate polymer was used instead of the ester methacrylate polymer was labeled as Comparative example 3.

(B) Manufacture Embodiments of the Brazing Composition 10 parts (solid equivalents) of each of the polymers of Embodiments 1–4 and Comparative examples 1–3 were mixed with 90 parts of a mixture of metal silicon powder (brazing material) and potassium fluoroaluminate (flux) at a weight ratio of 1:2. This was diluted with isopropyl alcohol, and a resin solution with a solid concentration of 50% was obtained.

The resin solution described above was coated with a bar coater onto an aluminum alloy tube material containing 0.4% copper and 0.15% manganese. The solid coating amount was 12±3 g/m$^2$. Afterwards, it was dried for approximately 5 minutes in a gear oven at 200 degrees C. The following tests were conducted using the resulting aluminum sample.

(C) Test Examples of the Binder and Brazing Composition

For each aluminum sample in which Embodiments 1–4 and Comparative examples 1–3 were used, various tests described below were conducted. Based on each of their evaluation criteria, the suitability of the various binders and the brazing compositions were evaluated.

1. Adhesion

After exposing each of the aluminum samples to 1 minute of running water, the falling off of the brazing composition was observed. The evaluation criteria were as below.
Circle: No falling off
Triangle: Some falling off was observed.
X: Everything fell off 2. Peeling Resistance Each of the aluminum samples was dropped onto concrete from a height of 30 cm. The falling off of the brazing composition was observed. The evaluation criteria were as below.
Circle: No falling off
Triangle: Some falling off was observed.
X: Everything fell off 3. Blocking Resistance The coated surfaces of each of the aluminum samples were pressed together for 1 minute with a pressure of 100 kg/cm$^2$. Afterwards, they were peeled off immediately, and the surface conditions of the coated surfaces were observed.
The evaluation criteria were as below.
Circle: Same as initial conditions.
X: Different from the initial conditions, partial falling off was observed.

4. Solvent Resistance

After immersing the aluminum samples in hexane for 8 hours, they were exposed to 1 minute of flowing water. After drying for 1 hour in a gear oven at 120 degrees C., the weights were measured. The change from the initial weight was calculated, and the evaluation criteria were as below.
Circle: reduction from the initial weight of less than 30%.
Triangle: reduction from the initial weight of 30% or greater but less than 70%.
X: reduction from the initial weight of 70% or greater.

5. Thermal Decomposition Under Nitrogen Atmosphere

Approximately 10 mg (solid equivalents) of each of the binders from Embodiments 1–4 and Comparative Examples 1–3 were placed in an aluminum cup that had a diameter of 5 mm and a height of 5 mm. Under a nitrogen atmosphere, the temperature was raised from room temperature to 600 degrees C. over approximately 30 minutes. The residue inside the aluminum cup was observed. The evaluation criteria were as below.
Circle: no residue was seen.
Triangle: very small amount of carbide residue was observed.
X: Large amount of carbide residue was observed.

6. Brazing Property (i) Method A

A bare fin of an aluminum alloy containing 1.2% manganese, 0.15% copper and 2.5% zinc were assembled onto each aluminum sample. Under a nitrogen gas atmosphere, the brazing test was conducted. The condition of the fillet in the joining site was observed. The evaluation criteria were as below.
Circle: Fillet was formed well.
Triangle: The formed fillet was small.
X: Fillet was not formed.

(ii) Method B

In the Method A described above, each of the aluminum samples described above were coated with the brazing composition comprising binder, brazing material and flux, and this was assembled onto the bare fin. In Method B, an aluminum sample coated with brazing composition comprising binder and flux was created, and another aluminum material which has been coated with brazing material was assembled onto this aluminum sample, and brazing was conducted.

In other words, 15 parts (solid equivalents) of the various polymers of Embodiments 1–4 and Comparative examples 1–3 were mixed with 85 parts of potassium fluoroaluminate (flux), and this was diluted with isopropyl alcohol and adjusted to obtain a resin solution with a solid concentration of 50%.

The resin solution described above was coated with a bar coater onto an aluminum alloy tube material containing 0.4% copper and 0.15% manganese. There was a solid coating amount of 3±1 g/m$^2$. Next, it was dried for approximately 5 minutes in a gear oven at 200 degrees C., and an aluminum sample was obtained.

A fin of a brazing sheet in which an aluminum alloy containing 1.2% manganese, 0.15% copper and 2.5% zinc was clad with a silicon-aluminum alloy was assembled onto the aluminum sample described above. Under a nitrogen gas atmosphere, brazing testing was conducted. The fillet condition of the joining site was observed. The evaluation criteria were the same as with Method A.

Figure 2:
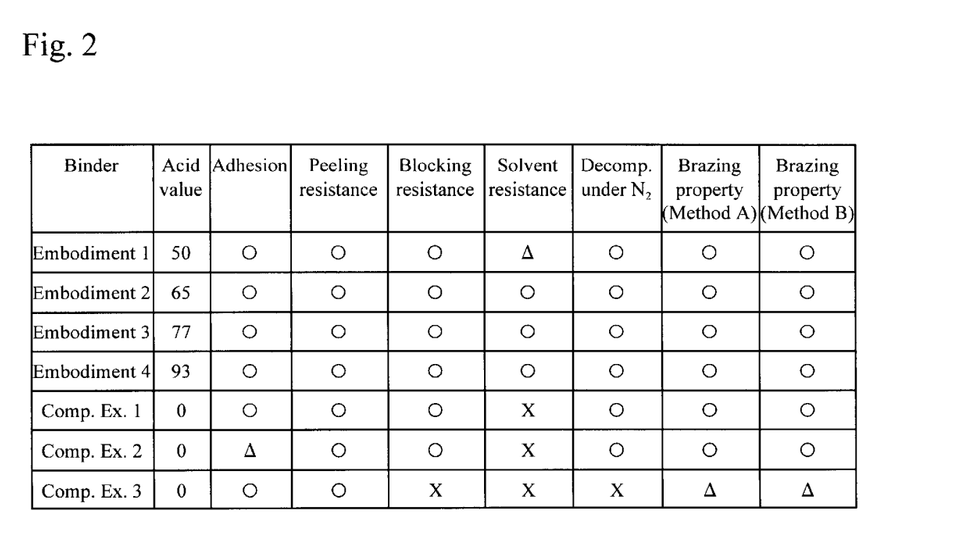
FIG. 2 is a diagram showing the test results for the brazing compositions when various ester methacrylate polymers are used.

Referring to FIG. 2, the results of the tests 1–6 described above are shown.

When the test results described above are studied, thermal decomposition was inferior for the brazing composition using a binder of ester acrylate polymer (Comparative example 3). Because of the carbide residues, the brazing properties (by both Methods A and B) were also poor. Furthermore, the blocking resistance and solvent resistance evaluations were also poor. In contrast, the brazing composition using a binder of ester methacrylate polymer (Embodiments 1–4 and Comparative examples 1–2) had good evaluations for thermal decomposition and brazing properties (for both Methods A and B). Furthermore, when the ester methacrylate polymer was a copolymer containing methacrylic acid (a monomer containing a carboxyl group) as a monomer component, and when its acid value was 20–80 (Embodiments 1–4), the adhesion, peeling resistance, and blocking resistance, and solvent resistance all had good evaluations.

However, when the acid value of the ester methacrylate polymer was 0 (Comparative Examples 1–2), the solvent resistance had a poor evaluation.

(2) Embodiments and Test Examples of Heat Curing Binders and Aluminum Brazing Compositions Using these Heat Curing Binders In these embodiments and test examples, a cross-linking agent was added as a sub component to the main component of the ester methacrylate polymer, and its suitability as a binder was tested. For convenience, other than the water-based binders, oil based binders are contained in a portion of the embodiments and in the test examples. Furthermore, in the present embodiments and test examples, heat curing binders are the standard, but photo curing binders are also included among the embodiments.

(A) Manufacture Embodiments of the Binder

EMBODIMENT 5

After placing 600 parts of isopropyl alcohol into a reaction device equipped with a stirring device, cooling pipe, drip funnel, and a nitrogen introducing pipe, the temperature was raised until the system temperature was 80 degrees C. under a nitrogen gas flow. Next, a mixture solution of 100 parts of methyl methacrylate, 275 parts of isobutyl methacrylate, 25 parts of methacrylic acid, and 4 parts of benzoyl peroxide was dripped into the system over three hours. The above temperature was maintained for another 10 hours, and the polymerization reaction was completed. A resin solution with an acid value of approximately 40 when dry was obtained.

Next, after placing 750 parts of the above resin solution, 700 parts of ion exchange water, and 18 parts of dimethyl amino ethanol into a reaction device equipped with a stirring device, a vapor condensation removal device, a nitrogen introducing pipe, the temperature was raised until, under a nitrogen gas flow, there was a circulating current within the system, and saponification was conducted. Using a vapor condensation removal device, 450 parts of the isopropyl alcohol in the system was removed. Next, 15 parts of polyoxirane that has a oxirane group concentration of 10 mmol/g when dry was added, and a brazing water-based binder with a solid concentration of 30% was obtained.

EMBODIMENT 6

A resin solution was obtained under the same conditions as in the Embodiment 5 described above. Under the same conditions as Embodiment 5, 750 parts of this resin solution, 700 parts of ion exchange water, and 18 parts of dimethyl amino ethanol were mixed and saponified. After removing the isopropyl alcohol, 15 parts of polyoxazoline that has a oxazoline group concentration of 10 mmol/g when dry was added. A brazing water-based binder with a solid concentration of 30% was obtained.

EMBODIMENT 7

A resin solution was obtained under the same conditions as in the Embodiment 5 as described above. 40 parts of an isocyanate group containing resin (it will be referred to as blocked isocyanate resin) that has a NCO % of 20 when dry and that has the isocyanate groups already enclosed with an equivalent amount of phenol was added to this resin solution. A brazing binder with a solid concentration of 40% was obtained.

EMBODIMENT 8

600 parts of isopropyl alcohol was placed in the same reaction device as in Embodiment 5 as described above. Next, the temperature was raised until the system temperature was 80 degrees C. under a nitrogen gas flow. Next, a mixture solution of 100 parts methyl methacrylate, 265 parts isobutyl methacrylate, 35 parts 2-hydroxyethyl methacrylate, and 4 parts of benzoyl peroxide was dripped into the system over approximately 3 hours. While maintaining the above temperature for another 10 hours, the polymerization reaction was completed. A resin solution with a hydroxyl value of approximately 40 when dry was obtained.

Next, 40 parts of a blocked isocyanate resin with a NCO % of 20 when dry that has its isocyanate group enclosed in advance with an equivalent amount of phenol was added to the resin solution described above. A brazing binder with a solid concentration of 40% was obtained.

EMBODIMENT 9

600 parts of n-butanol was placed in the same reaction device as in Embodiment 5. Next, the temperature was raised until the system temperature was 80 degrees C. under a nitrogen gas flow. Next, a mixture solution of 100 parts methyl methacrylate, 290 parts isobutyl methacrylate, 10 parts methacrylic acid, and 4 parts benzoyl peroxide was dripped into the system over approximately three hours. While maintaining the above temperature for another 10 hours, the polymerization reaction was completed. A resin solution containing carboxyl groups with an acid value of approximately 15 when dry was obtained.

Next, 100 parts of the resin solution described above, 1.5 parts 2-hydroxyethyl methacrylate (a monomer having both a hydroxyl group and a vinyl group), 0.1 part p-sulfonic acid were added to a reaction device equipped with a stirring device, cooling pipe, water removal device, and an air introducing pipe. While air was blown in, dehydration reaction was completed by letting it stand under circulating current for approximately 8 hours. Next, 0.1 part hydroquinone and 1 part t-butyl peroxide as the thermal polymerization initiator were added. A brazing (heat curing) binder with a solid concentration of 40% was obtained.

EMBODIMENT 10

A resin solution was obtained under the same conditions as Embodiment 9. Instead of a thermal polymerization initiator of t-butyl peroxide, benzyl dimethyl ketal as a photopolymerization initiator was used. Everything else was conducted under the same conditions as in Embodiment 9. A brazing (photo curing) binder with a solid concentration of 40% was obtained.

COMPARATIVE EXAMPLE 4

A resin solution was obtained under the same conditions as Embodiment 5. A heat curing agent was not added, and this resin solution was used directly as the brazing binder.

COMPARATIVE EXAMPLE 5

The addition amount of the isocyanate group containing resin of Embodiment 8 was increased to 100 parts. Everything else was conducted the same as in Embodiment 8. A brazing binder with a solid concentration of 40% was obtained.

COMPARATIVE EXAMPLE 6

Based on Embodiment 8, instead of using blocked isocyanate resin, 40 parts of a reactive isocyanate group containing resin with a NCO % of 20 when dry was added to the resin solution. Everything else was conducted the same as in Embodiment 8. A brazing binder with a solid concentration of 40% was obtained.

COMPARATIVE EXAMPLE 7

Based on Embodiment 5, instead of using polyoxirane, 15 parts of a commercial butylated melamine resin was added. Everything else was conducted the same as in Embodiment 5. A brazing binder with a solid concentration of 30% was obtained.

The butylated melamine resin described above corresponds to the curing agent disclosed in the publications of the prior art described in the beginning.

(B) Manufacture Embodiments of the Brazing Composition

Each of the binders from Embodiments 5–10 and Comparative examples 4–7 were mixed with flux and brazing material under the conditions in the following (i) or (ii). This mixture was diluted so that the solid concentration was 50%. Aluminum brazing compositions were obtained.

(i) 10 parts binder (solid equivalents) was mixed with 90 parts of flux of potassium fluoroaluminate.

(ii) 10 parts binder was mixed with 90 parts of a mixture of potassium fluoroaluminate (flux) and metal silicon powder (brazing material) with a weight ratio of 2:1.

Next, using a roller coater, the brazing compositions were coated onto aluminum alloy tube materials containing 0.4% copper and 0.15% manganese. In the brazing composition obtained from method (i), the coating amount was $5\pm1$ g/m$^2$, and in the brazing composition obtained from method (ii), the coating amount was $10\pm1$ g/m$^2$. These were dried in a gear oven at 180 degrees C. for approximately 1 minute. However, when using the photo curing binder of Embodiment 10, after coating with the brazing composition, the aluminum alloy tube material was irradiated through 4 passes with a converging ultraviolet lamp of 8W/cm from a height of 10 cm at a speed of 40 m/min.

(C) Test Examples of the Brazing Composition

Various tests described below were conducted on each of the aluminum alloy tube material (will be referred to as the aluminum sample) that used each of the binders from Embodiments 5–10 and Comparative examples 4–7. Based on each of the evaluation criteria, the suitability of the various brazing compositions were evaluated.

1. Viscosity Stability

Each of the brazing compositions using the binders of Embodiments 5–10 and Comparative examples 4–7 were placed in a sealed container and left for 14 days at 50 degrees C. Any changes from the initial state was observed. The evaluation criteria were as follows.

Circle: No changes in the outward appearance of the brazing composition was observed. The rise in viscosity was at or below 150% of the initial value.

Triangle: No changes in the outward appearance of the brazing composition.

However, the rise in viscosity was

150% or greater than the initial value.

X: There were changes in the outward appearance of the brazing composition, or this brazing composition had solidified.

2. Blocking Resistance

The aluminum samples that have been coated with the brazing composition have their coated surfaces pressed together at a pressure of 100 kg/cm$^2$ for 1 minute. Next, they were immediately peeled, and the surface conditions of the mutual coated surfaces were observed. The evaluation criteria were as follows.

Circle: Same as the initial conditions

X: Differed from the initial conditions; partial falling off was observed.

3. Initial Coating Hardness

The pencil hardness of the surface of each of the aluminum samples that have been coated with the brazing compositions was measured by a test method based on JIS-K5400. The pencil hardness reduces in the order of H, F, HB, B. In the B sequence, the larger the number that comes before B, the softer the pencil hardness (in other words 3B is softer than 2B, 2B is softer than B).

4. Solvent Resistance

Each of the aluminum samples that have been coated with the brazing composition was immersed for 120 hours in hexane. Next, in this condition, the pencil hardness was measured by a test method based on JIS-K5400.

5. Brazing Property

Figure 5:
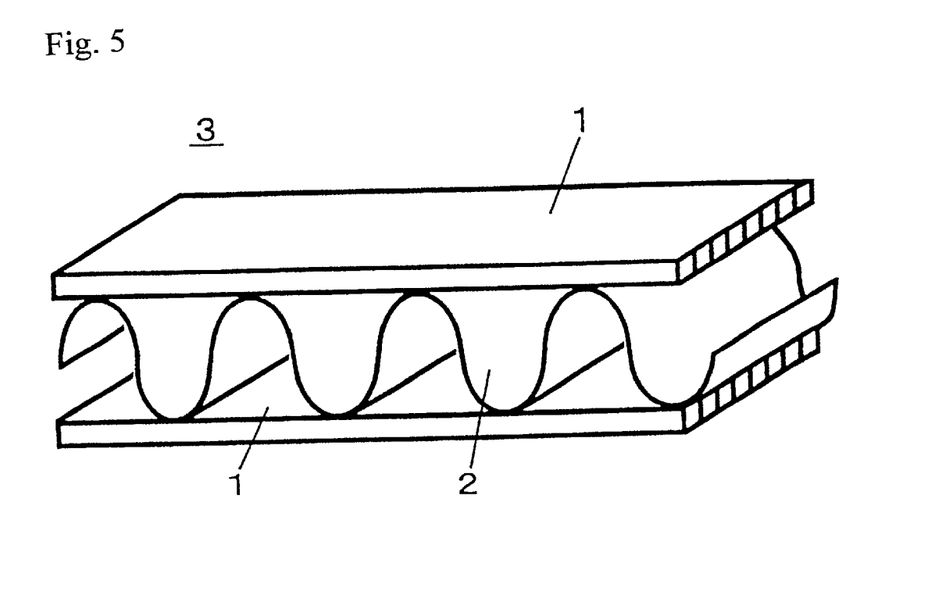
FIG. 5 is a cut-out perspective view of a brazing construction in which several aluminum materials are assembled together.

Referring to FIG. 5, a fin 2 of a brazing sheet in which a silicon-aluminum alloy was clad onto an aluminum alloy containing 1.2% manganese and 2.5% zinc was assembled onto aluminum sample 1, which has been coated with the brazing composition obtained by the method in (i) described above. This was heated to 600 degrees C. under a nitrogen gas atmosphere, and the brazing test was conducted. The fillet of the joining site was observed.

A bare fin of an aluminum alloy containing 1.2% manganese and 2.5% zinc was assembled onto the aluminum sample that has been coated with the brazing composition obtained by method (ii) described above. This was heated to 600 degrees C. under a nitrogen atmosphere, and the brazing test was conducted, and the fillet of the joining site was observed.

The evaluation criteria were as follows.

Circle: Fillet formed well.

Triangle: The fillet that has formed was small

X: Fillet was not formed.

Figure 3:
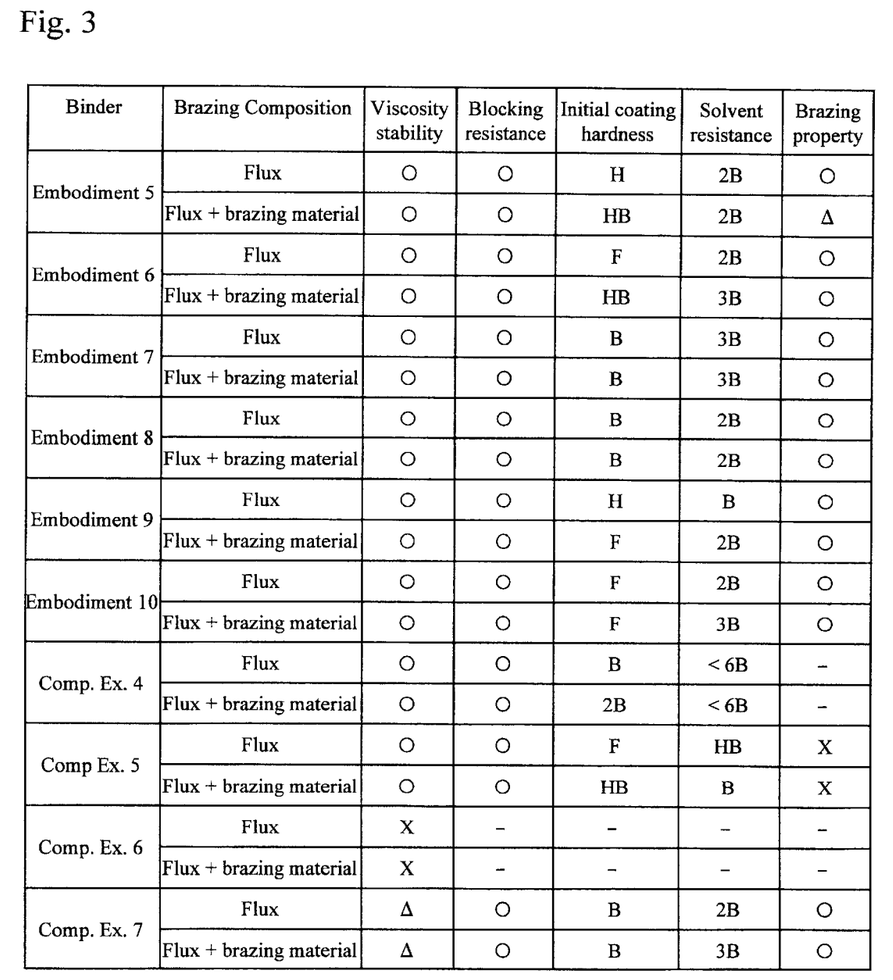
FIG. 3 is a diagram showing the test results of the brazing composition when various heat curing binders are used.

Referring to FIG. 3, the results from the tests 1–5 described above are shown.

When the above test results are studied, the brazing compositions that used heat curing (or photo curing) binders of Embodiments 5–10 is compared with the brazing composition that used a binder of Comparative example 4 which is not heat curing. In the initial coating hardness and the solvent resistance tests, as can be seen from the pencil hardness at which peeling of the coating takes place, the coating hardness was harder when using a heat curing binder. It was observed that the initial coating hardness and the solvent resistance increased.

Furthermore, as in the binder of Comparative example 5, when an excess of blocked isocyanate resin was added to the ester methacrylate polymer, the thermal decomposition of the binder was reduced, and this had a negative impact on the brazing property. As in the binder of Comparative example 6, when a reactive isocyanate group containing resin was added, the viscosity stability was reduced, and thickening was observed.

Furthermore, in the heat curing binder of Comparative example 7, when melamine resin, which has been disclosed in a publication of the prior art, was added, the viscosity stability was observed to be inferior compared with the heat curing (or photo curing) binders of Embodiments 5–10.

As described above, regardless of whether the binder is water-based, the technique of heat curing is used for a binder in which the main component is a ester methacrylate polymer. The means for endowing to the binder special properties such as good room temperature adhesion and solvent resistance are the following: a method of adding polyoxirane, polyoxazoline, or blocked isocyanate resin, or the method of adding a polymerization initiator to an ester methacrylate polymer into which a vinyl group is introduced. In the above Embodiments 5–6, this polyoxirane and polyoxazoline were added to saponified resin solution. In Embodiments 7–8, blocked isocyanate resin was added to a resin solution that was not saponified.

In the above method of using polyoxirane or polyoxazoline, a general explanation of their mixing ratios and the like, as well as noteworthy points have already been stated, but with regard to the other methods, the description has been limited to the concrete examples described in Embodiments 7–10. A general explanation and noteworthy points for these methods are described in detail below.

First, the method for using the blocked isocyanate resin can be divided into the following methods (a) and (b).

(a) 1–20 weight parts of the isocyanate containing resin described above is added to 100 weight parts of an ester methacrylate polymer of an acid value between 1–100. If over 20 weight parts are added, carbides are generated at the time of brazing, and a negative effect on the brazing is seen. In the blocked resin described above, the isocyanate group can be enclosed by a phenol, xylenol, alcohol, e-caprolactam, methyl ethyl ketone oxime, or acetyl acetone, or the like. If a reactive isocyanate group containing resin is used instead of a blocked resin, as shown in the above test example, while the brazing composition is being coated onto the aluminum material, this composition thickens. The coating operation can become difficult.

Furthermore, it is preferable if the NCO % of the isocyanate group containing resin is between 1–50 when dry. If it is less than 1%, the heat curing property of the main component is reduced.

(b) The main component is the ester methacrylate polymer that has been adjusted so that the hydroxyl value is 1–100. For every 100 weight parts of this polymer, 1–20 weight parts of an isocyanate group containing resin that has an NCO % of 1–50 when dry is added. If the hydroxyl value exceeds 100, carbides can be generated when brazing, and a negative effect on the brazing is seen. If the hydroxyl value is less than 1, the heat curing property with the isocyanate group containing resin is reduced. Therefore, from both the standpoint of heat curing and brazing, the above hydroxyl value is between 1–100, and is preferably 10–80. In this case, as the ester methacrylate polymer that is the main component, a copolymer containing at least one component of the monomer in the previous formula (1) and at least one component of the monomer containing a hydroxyl group represented by the previous formula (2) or (3) can be used.

Next, for the method of adding a heat polymerization initiator to a polymer in which 2 or more vinyl groups capable of polymerization are introduced into one molecule, for every 100 weight parts of the ester methacrylate polymer that satisfies these conditions, 0.01–10 weight parts of thermal polymerization initiator is added. However, the method by which a vinyl group capable of polymerization is introduced into the molecule is not limited to the method indicated in Embodiment 9 (a dehydration reaction between a carboxyl group containing polymer and a hydroxyl group containing monomer), and it can be introduced by known methods.

For the above heat polymerization initiator, one that has a 10 hour half life temperature of 100 degrees C. or higher, such as t-hexyl peroxide or t-butyl peroxide, is preferable. If a heat polymerization initiator with a 10 hour half-life temperature of less than 100 degrees is used, the pot life of the brazing composition is shortened, and the viscosity increases during storage. Therefore, in order to have long term stability of this composition, it is preferable to have a heat polymerization initiator with a 10 hour half-life temperature of 150 degrees C. or higher.

Instead of using a heat polymerization initiator, a photo polymerization initiator can be used. This photo polymerization initiator is added to the above polymer in which a vinyl group has been introduced, and a photo curing binder is created. Examples of the above photo polymerization initiator include benzyl methyl ketal, 2-hydroxy-2methyl-1-phenyl-propane-1-on, or 2-benzyl-2-dimethyl amino-1-(4-morpholinophenyl)-butanone-1, and the like. The addition ratio of the photo polymerization initiator is the same as with the heat polymerization initiator.

(3) Embodiments and Test Examples of the Water-based Binder for Brazing and Brazing Composition Using the Water-based Binder.

In the present embodiments and test examples, the ester methacrylate polymer, which is the main component, is saponified to make it aqueous. Their suitability as binders were tested.

(A) Manufacture Embodiments of the Binder

EMBODIMENT 11

After placing 600 parts of isopropyl alcohol in a reaction device equipped with a stirring device, cooling pipe, drip funnel, and a nitrogen introducing pipe, the temperature was raised to a system temperature of 80 degrees C. under a nitrogen gas flow. Next, a mixture solution of 385 parts of 2-ethylhexyl methacrylate, 15 parts of methacrylic acid, and 4 parts of benzoyl peroxide was dripped into the system over approximately 3 hours. The temperature was maintained for another 10 hours, and the polymerization reaction was completed. The acid value when dry was approximately 25. A resin solution with a glass transition temperature of approximately −5 degrees C. was obtained.

Next, 100 parts of this resin solution, 227 parts of ion exchange water, and 3 parts of dimethyl amino ethanol were placed in a reaction device equipped with a stirring device, vapor condensation removal device, and a nitrogen introduction pipe. Next, under a nitrogen gas flow, the temperature was raised until there was a circular flow within the system, and saponification was conducted. Using the vapor condensation removal device, 60 parts of isopropyl alcohol were removed from the system. A water based binder for aluminum brazing with a solid concentration of 15% was obtained.

EMBODIMENT 12

Based on Embodiment 11, instead of the mixture solution of 385 parts 2-ethylhexyl methacrylate, 15 parts methacrylic acid, and 4 parts benzoyl peroxide, a mixture solution of 350 parts 2-ethylhexyl methacrylate, 50 parts methacrylic acid, and 4 parts benzoyl peroxide was used. All of the other conditions were the same as in Embodiment 11. A resin solution with an acid value of approximately 80 when dry and a glass transition temperature of approximately 0 degrees C. was obtained.

Next, under the same conditions as in Embodiment 11, 100 parts of the resin solution, 227 parts of ion exchange water, and 3 parts of dimethyl amino ethanol were saponified, the isopropyl alcohol was removed, and a water-based binder for aluminum brazing with a solid concentration of 15% was obtained.

COMPARATIVE EXAMPLE 8

Based on Embodiment 11, instead of the mixture solution of 385 parts 2-ethylhexyl methacrylate, 15 parts methacrylic acid, and 4 parts benzoyl peroxide, a mixture solution of 385 parts lauryl methacrylate, 15 parts of methacrylic acid, and 4 parts of benzoyl peroxide was used. All of the other conditions were the same as Embodiment 11. A resin solution with an acid value of approximately 25 when dry and a glass transition temperature of approximately −60 degrees C. was obtained.

Next, under the same conditions as Embodiment 11, 100 parts of this resin solution, 227 parts of ion exchange water, and 3 parts of the dimethyl amino ethanol were saponified, isopropyl alcohol was removed, and a water-based binder for aluminum brazing with a solid concentration of 15% was obtained.

COMPARATIVE EXAMPLE 9

Based on Embodiment 11, instead of the mixture solution of 385 parts 2-ethylhexyl methacrylate, 15 parts methacrylic acid, and 4 parts benzoyl peroxide, a mixture solution of 285 parts butyl methacrylate, 100 parts of methyl methacrylate, 15 parts of methacrylic acid, and 4 parts of benzoyl peroxide was used. All of the other conditions were the same as in Embodiment 11. A resin solution with an acid value of approximately 25 when dry and a glass transition temperature of 80 degrees C. was obtained.

Next, under the same conditions as for Embodiment 11, 100 parts of the resin solution, 227 parts of the ion exchange water, and 3 parts of dimethyl amino ethanol were saponified, and isopropyl alcohol was removed. A water-based binder for aluminum brazing with a solid concentration of 15% was obtained.

COMPARATIVE EXAMPLE 10

Based on Embodiment 11, instead of the mixture solution of 385 parts 2-ethylhexyl methacrylate, 15 parts methacrylic acid, and 4 parts benzoyl peroxide, a mixture solution of 337 parts 2-ethylhexyl methacrylate, 63 parts of methacrylic acid, and 4 parts of benzoyl peroxide was used. All of the other conditions were the same as in Embodiment 11. A resin solution with an acid value of approximately 100 when dry and a glass transition temperature of approximately 5 degrees C. was obtained.

Next, under the same conditions as Embodiment 11, 100 parts of the resin solution, 227 parts of the ion exchange water, and 3 parts of the dimethyl amino ethanol were saponified, isopropyl alcohol was removed, and a water-based binder for aluminum brazing with a solid concentration of 15% was obtained.

(B) Manufacture Embodiment of the Aluminum Brazing Composition

Each of the water based binders from Embodiments 11–12 and Comparative examples 8–10 were mixed with flux and brazing material under conditions of (i) or (ii). Various alcohols shown in FIG. 4 were added to these mixtures and the mixtures were diluted with water, or the alcohols were not added and the mixtures were diluted with water. An aluminum brazing composition with a solid concentration of 15% was obtained.

(i) 10 parts (solid equivalents) of binder is mixed with 90 parts of flux of potassium fluoroaluminate.

(ii) 10 parts (solid equivalents) of binder is mixed with a mixture of 60 parts of potassium fluoroaluminate (flux) and 30 parts of metal silicon powder (brazing material).

In items (b)–(c) of the embodiments of the heat curing binder of the test example (2) described previously, the aluminum alloy tube was assembled with the fin material after the tube was coated with the brazing composition, but in the present embodiments and test examples, the brazing composition was coated on after assembling the tube material and the fin material.

Therefore, referring to FIG. 5, a brazing construction 3 for brazing was created by assembling a tube material 1 of an aluminum alloy containing 0.4% copper and 0.15% manganese and a brazing sheet fin 2 as described in item 5 of (c) of the test example (2). Construction 3 was immersed for 10 seconds in the solution of the brazing composition (flux and water-based binder) obtained by the method (i) described previously. After removing the structure from the solution, it was dried in a gear oven at 180 degrees C. for approximately 1 minute.

In the case of brazing construction 3 where a bare fin 2 as described in item 5 of (c) of (2) described above was assembled onto an aluminum alloy tube material 1, this structure was immersed for 10 seconds in the brazing composition solution (flux, brazing material, and water-based binder) obtained by method (ii). Using a gear oven, it was dried under the same conditions.

(C) Test Examples of the Brazing Composition

Each of the following tests was conducted for each of the brazing constructions (aluminum samples) in which the brazing compositions containing the water based binder of Embodiments 11–12 and Comparative examples 8–10 were used. Based on each of the evaluation criteria, the suitability of the various brazing compositions were evaluated.

1. Flammability

Using a sealed tag flash point measuring device, the flammability of each of the brazing compositions that used the water-based binder of Embodiments 11–12 and Comparative examples 8–10 were measured. The evaluation criteria are as follows.

Circle: Flammability was not observed in the course of events up until the water evaporated.

Triangle: Flammability was observed at 40 degrees C. or greater.

X: Flammability was observed at less than 40 degrees C.

2. Wettability

The brazing compositions were immersion coated onto the aluminum samples. After heating and drying, the coating conditions of these brazing compositions were observed. The evaluation criteria were as follows. Circle: No cissing phenomenon. The unevenness in coating amount at each site was ±20% or less.

Triangle: Not a large amount of cissing phenomenon, but the unevenness in coating amount at each site was ±20% or greater.

X: A large amount of cissing phenomenon was observed. There were areas with no coating.

3. Blocking Resistance

The coated surfaces of each of the aluminum samples, which have been coated with brazing composition, were pressed together for 1 minute with a pressure of 100 kg/cm$^2$. Afterwards, it was peeled off immediately, and the surface conditions of the coated surfaces were observed. The evaluation criteria were as follows.

Circle: The same as initial conditions.

X: Different from the initial conditions, partial falling off of coating was observed.

4. Brazing Property

The aluminum samples were assembled into the specified configuration and coated with the brazing composition through immersion. After heating and drying, brazing was conducted by heating to 600 degrees C. under a nitrogen gas atmosphere. The carbonization state of the binder and the state of the fillet in the joint site were observed. The evaluation criteria are as follows.

Circle: No carbide residues of the binder were observed. Fillet was formed well.

Triangle: Fillet was good, but some carbide residues of the binder were observed.

X: Carbide residues of the binder were seen. The formed fillet was also small.

Figure 4A:
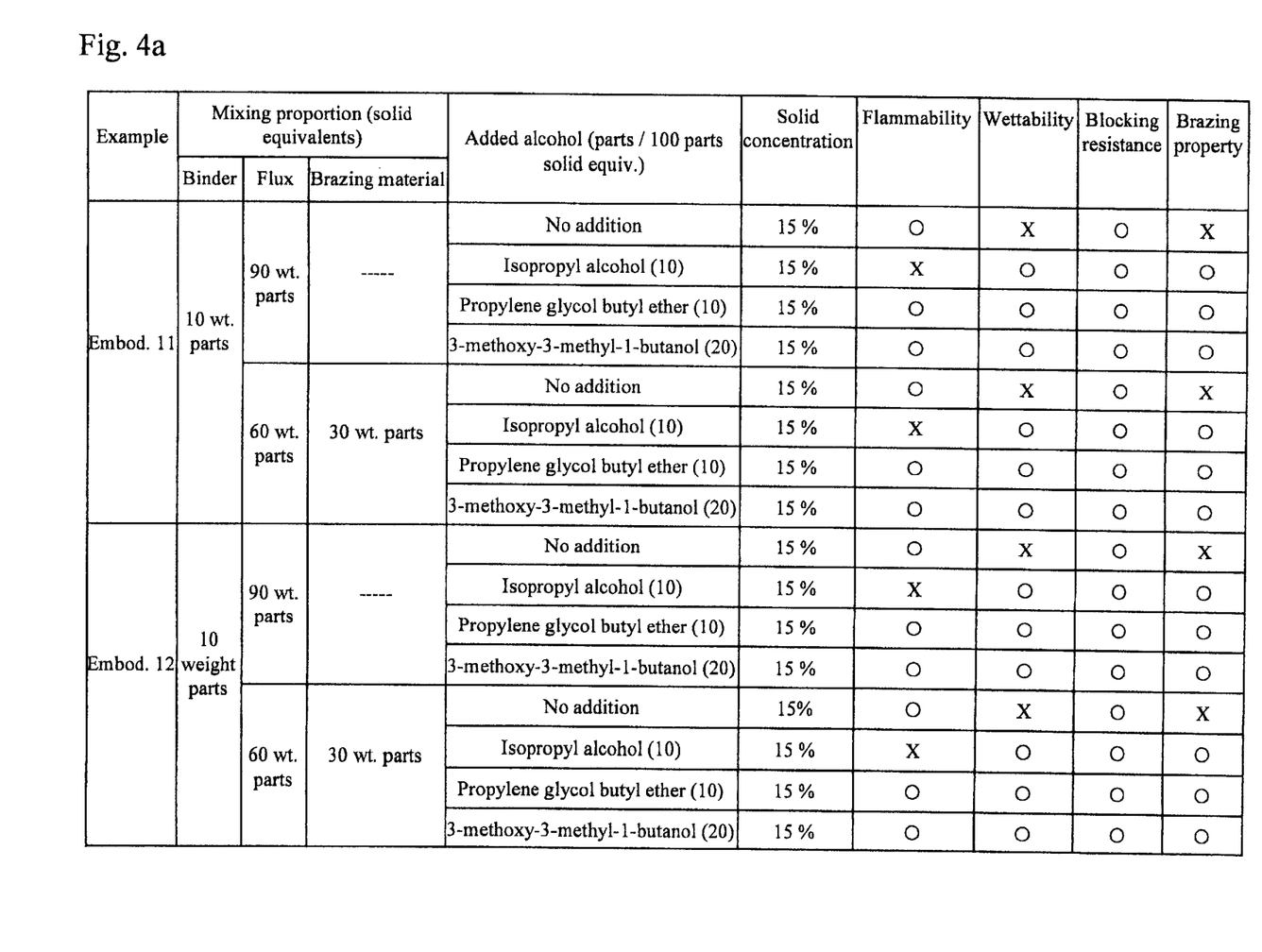
FIG. 4 is a diagram showing the test results of the brazing composition when various water based binders and various alcohols are used.
Figure 4B:
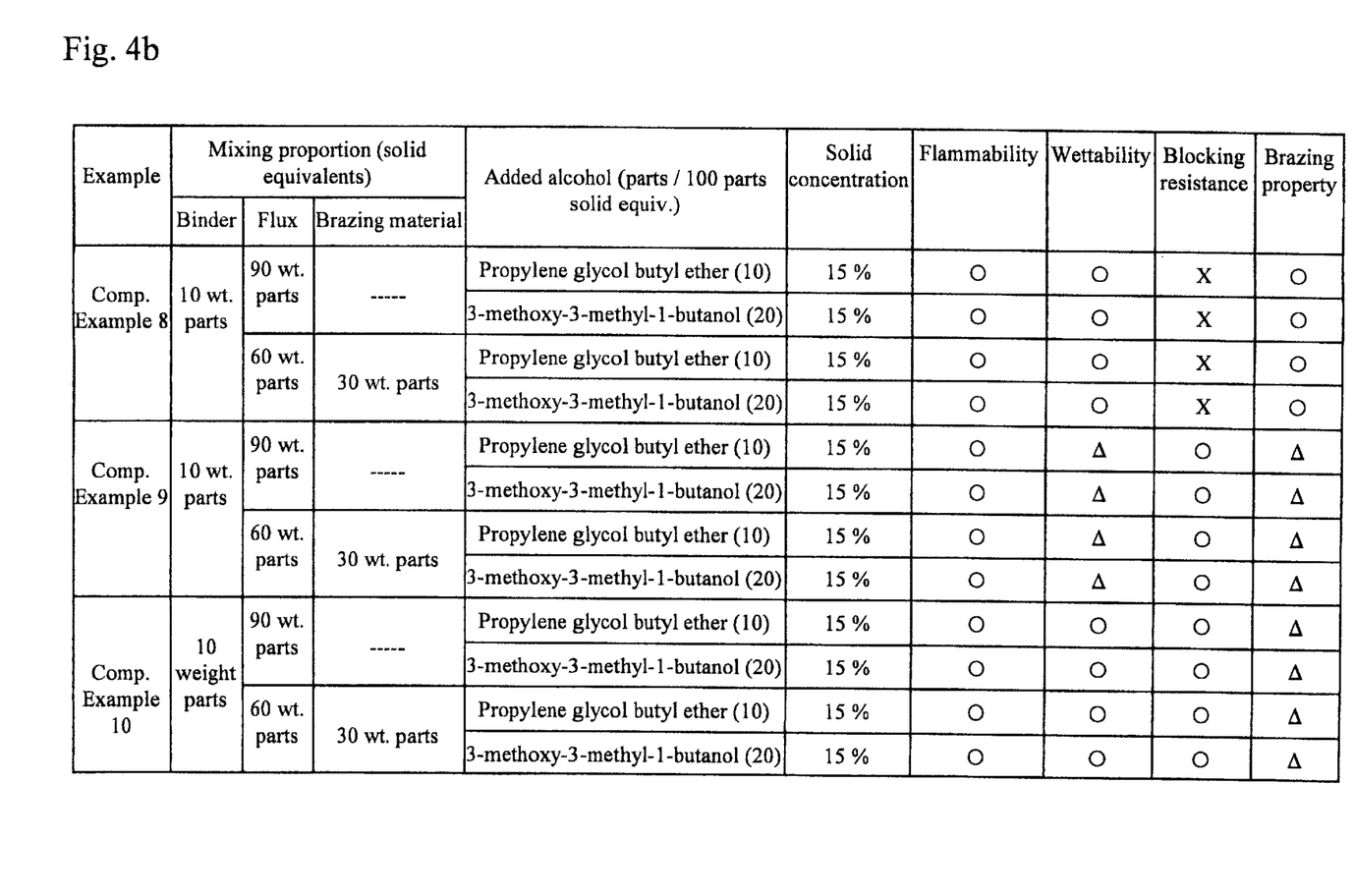

Referring to FIG. 4, the results of the above tests 1–4 are shown.

When the above test results were studied, with regard to the brazing compositions that used the water-based binder of Embodiments 11–12, when alcohol was not added, there were good results in terms of flammability, but the wettability and brazing property were inferior. On the other hand, when isopropyl alcohol with a flash point of less than 30 degrees C. was added, the wettability was good, but it was inferior in terms of flammability.

When certain alcohols (propylene glycol butyl ether, or the like) that have a flash point of 30 degrees C. or greater were added, flammability, wettability, blocking resistance, and brazing property were all good. Therefore, in this case, because the binder was water-based and certain alcohols were used, there was no danger due to fire or explosion, and the wettability with respect to the aluminum material was also improved (in other words, without causing the cissing phenomenon). The brazing composition could be coated uniformly and smoothly with only the necessary amount.

On the other hand, even if the certain alcohols described above were added, when a water based binder (Comparative example 8) that has its main component as an ester methacrylate polymer with a glass transition temperature of approximately −60 degrees C. was used, the blocking resistance was inferior. Furthermore, with the water-based binder (Comparative example 9) that has its main component as an ester methacrylate polymer with a glass transition temperature of approximately 80 degrees C., the wettability and brazing property were not good. With the water-based binder that has its main component as an ester methacrylate polymer with an acid value of 100 (Comparative example 10), carbide residues were seen, and as a result, brazing property was not good.

Possibility of use in Industry

As described above, when manufacturing aluminum brazing products, such as engine radiators, car air conditioner condensers, evaporators, intake and exhaust manifolds for the same engine, and the like, the water-based binder of the present invention is useful as a compound that can insure the adhesion of the brazing composition onto the aluminum material. The brazing composition to which this binder has been added has no risk of catching on fire or exploding. Even though it is water-based, it can coat the aluminum material uniformly. As a result, no explosion-proof devices are needed, and mass production of the brazing product can be conducted smoothly. As a result, it is particularly suitable for production sites of automobile parts and the like such as automobile engines or car air conditioners.

What is claimed is:

1. A water based binder for brazing aluminum materials comprising:
   an ester methacrylate polymer;
   said ester methacrylate polymer having a glass transition temperature between about −30° C. to 60° C., and an acid value between about 20 to 80 mgKOH/g when dry;
   said ester methacrylate polymer capable of being saponified by a compound having cationic properties in an aqueous solution; and
   said ester methacrylate polymer capable of forming an aqueous solution with a solid concentration of between about 1 to 50 weight percent.

2. A water based binder for brazing aluminum materials according to claim 1, wherein:
   said ester methacrylate polymer is a copolymer having at least a first monomer component and a second monomer component;
   said first monomer component is a monomer represented by the following formula (1)

$$CH_2=C(CH_3)COOR \qquad \text{Formula (1)}$$

wherein R is a branched or straight chain $C_1$–$C_{12}$ alkyl group; and
   said second monomer component is a carboxyl group containing monomer capable of copolymerizing with said first monomer component.

3. A water based binder for brazing aluminum materials according to claim 2, wherein said second monomer component is selected from the group consisting of acrylic acid, methacrylic acid, maleic acid, and itaconic acid.

4. A water based binder for brazing aluminum materials according to claim 2, further comprising:
   at least a third monomer component having a hydroxyl group and being capable of copolymerizing with at least one of said first monomer component and said second monomer component;
   said third monomer component is a monomer represented one of the following formula (2) and formula (3)

$$CH_2=C(CH_3)COO(CH_2)_kOH \qquad \text{Formula (2)}$$
   $$CH_2=C(CH_3)COO-(EO)_n-(PO)_m-H \qquad \text{Formula (3)}$$

wherein k is an integer from 2 to 4, m and n are each independently an integer from 0 to 12, EO represents an oxyethylene group, $C_2H_4O$, and PO represents an oxypropylene group $C_3H_6O$, provided that at least one of m and n>0.

5. A water based binder for brazing aluminum materials according to claim 1, further comprising:
   a polyoxirane having an oxirane group concentration from about 0.1 to 100 mmol/g when dry; and
   said water based binder has from about 0.1 to 20 parts by weight of said polyoxirane per 100 parts by weight of said ester methacrylate polymer.

6. A water based binder for brazing aluminum materials according to claim 1, further comprising:
   a polyoxazoline having an oxazoline group concentration from about 0.1 to 100 mmol/g when dry; and
   said water based binder has from about 0.1 to 20 parts by weight of said polyoxazoline per 100 parts by weight of said ester methacrylate polymer.

7. An aluminum brazing composition comprising:
   from about 1 to 50 parts by weight in solid equivalents of a water based binder;
   said water based binder being an ester methacrylate polymer having a glass transition temperature between about −30° C. to 60° C. and an acid value between about 20 to 80 when dry;
   said ester methacrylate polymer capable of being saponified by a compound having cationic properties in an aqueous solution;

said ester methacrylate polymer capable of forming an aqueous solution with a solid concentration of between about 1 to 50 weight percent; and said aluminum brazing composition being diluted with water.

8. An aluminum brazing composition according to claim 7, further comprising:

from about 50 to 100 parts by weight in solid equivalents of a fluoroaluminate flux;

from about 1 to 50 parts by weight in solid equivalents of a volatile, water-soluble alcohol having a flash point of at least 30° C.

9. An aluminum brazing composition according to claim 7, further comprising:

from about 30 to 70 parts by weight in solid equivalents of a fluoroaluminate flux;

from about 10 to 40 parts by weight in solid equivalents of a silicon brazing material; and from about 1 to 50 parts by weight in solid equivalents of a volatile, water-soluble alcohol having a flash point of at least 30° C.

10. An aluminum brazing composition according to claim 7, wherein:

said ester methacrylate polymer is a copolymer having at least a first monomer component and a second monomer component;

said first monomer component is a monomer represented by the following formula (1)

$$CH_2=C(CH_3)COOR \qquad \text{Formula (1)}$$

wherein R is a branched or straight chain $C_1$–$C_{12}$ alkyl group; and said second monomer component is a carboxyl group containing monomer capable of copolymerizing with said first monomer component.

11. An aluminum brazing composition according to claim 10, wherein said second monomer component is selected from the group consisting of acrylic acid, methacrylic acid, maleic acid, and itaconic acid.

12. An aluminum brazing composition according to claim 10, further comprising:

at least a third monomer component having a hydroxyl group and being capable of copolymerizing with at least one of said first monomer component and said second monomer component;

said third monomer component is a monomer represented one of the following formula (2) and formula (3)

$$CH_2=C(CH_3)COO(CH_2)_kOH \qquad \text{Formula (2)}$$

$$CH_2=C(CH_3)COO-(EO)_n-(PO)_m-H \qquad \text{Formula (3)}$$

wherein k is an integer from 2 to 4, m and n are each independently an integer from 0 to 12, EO represents an oxyethylene group, $C_2H_4O$, and PO represents an oxypropylene group $C_3H_6O$, provided that at least one of m and n>0.

13. An aluminum brazing composition according to claim 7, further comprising:

a polyoxirane having an oxirane group concentration from about 0.1 to 100 mmol/g when dry; and said water based binder has from about 0.1 to 20 parts by weight of said polyoxirane per 100 parts by weight of said ester methacrylate polymer.

14. An aluminum brazing composition according to claim 7, further comprising:

a polyoxazoline having an oxazoline group concentration from about 0.1 to 100 mmol/g when dry; and said water based binder has from about 0.1 to 20 parts by weight of said polyoxirane per 100 parts by weight of said ester methacrylate polymer.

15. A method for brazing aluminum materials, comprising:

contacting a brazing composition with at least a portion of at least one of a first aluminum material and a second aluminum material;

said brazing composition being diluted with water;

said brazing composition having from about 1 to 50 parts by weight in solid equivalents of a water based binder;

said water based binder being an ester methacrylate polymer having a glass transition temperature between about −30° C. to 60° C. and an acid value between about 20 to 80 when dry;

said ester methacrylate polymer capable of being saponified by a compound having cationic properties in an aqueous solution;

said ester methacrylate polymer capable of forming an aqueous solution with a solid concentration of between about 1 to 50 weight percent;

supplying flux to at least a portion of one of said first aluminum material and said second aluminum material;

supplying a brazing material to at least a portion of one of said first aluminum material and said second aluminum material;

assembling said first aluminum material and said second aluminum material into a specified configuration; and heating and brazing said first aluminum material with said second aluminum material.

16. A method for brazing aluminum materials according to claim 15, wherein:

said ester methacrylate polymer is a copolymer having at least a first monomer component and a second monomer component;

said first monomer component is a monomer represented by the following formula (1)

$$CH_2=C(CH_3)COOR \qquad \text{Formula (1)}$$

wherein R is a branched or straight chain $C_1$–$C_{12}$ alkyl group; and said second monomer component is a carboxyl group containing monomer capable of copolymerizing with said first monomer component.

17. A method for brazing aluminum materials according to claim 16, wherein said second monomer component is selected from the group consisting of acrylic acid, methacrylic acid, maleic acid, and itaconic acid.

18. A method for brazing aluminum materials according to claim 16, further comprising:

adding at least a third monomer component, having a hydroxyl group, being capable of copolymerizing with at least one of said first monomer component and said second monomer component to said water based binder;

said third monomer component is a monomer represented one of the following formula (2) and formula (3)

$$CH_2=C(CH_3)COO(CH_2)_kOH \qquad \text{Formula (2)}$$

$$CH_2=C(CH_3)COO-(EO)_n-(PO)_m-H \qquad \text{Formula (3)}$$

wherein k is an integer from 2 to 4, m and n are each independently an integer from 0 to 12, EO represents an oxyethylene group, $C_2H_4O$, and PO represents an oxypropylene group $C_3H_6O$, provided that at least one of m and n>0.

19. A method for brazing aluminum materials according to claim 15, further comprising:

adding a polyoxirane having an oxirane group concentration from about 0.1 to 100 mmol/g when dry to said water based binder; and said water based binder has from about 0.1 to 20 parts by weight of said polyoxirane per 100 parts by weight of said ester methacrylate polymer.

20. A method for brazing aluminum materials according to claim 15, further comprising:

adding a polyoxazoline having an oxazoline group concentration from about 0.1 to 100 mmol/g when dry to said water based binder; and said water based binder has from about 0.1 to 20 parts by weight of said polyoxazoline per 100 parts by weight of said ester methacrylate polymer.

* * * * *